US006783821B2

(12) United States Patent
Ries et al.

(10) Patent No.: US 6,783,821 B2
(45) Date of Patent: Aug. 31, 2004

(54) POLYAMIDE COMPOSITE HAVING TWO OR MORE LAYERS

(75) Inventors: Hans Ries, Marl (DE); Guido Schmitz, Duelmen (DE); Harald Haeger, Recklinghausen (DE)

(73) Assignee: Degussa AG, Duesseldorf (DE)

( * ) Notice: Subject to any disclaimer, the term of this patent is extended or adjusted under 35 U.S.C. 154(b) by 70 days.

(21) Appl. No.: 10/024,379

(22) Filed: Dec. 21, 2001

(65) Prior Publication Data

US 2002/0119272 A1 Aug. 29, 2002

(30) Foreign Application Priority Data

Dec. 21, 2000 (DE) .......................................... 100 64 334

(51) Int. Cl.[7] .............................. B32B 1/02; B32B 1/08
(52) U.S. Cl. .................... 428/34.1; 428/35.7; 428/36.8; 428/36.9; 428/423.5; 428/474.9; 428/903.3
(58) Field of Search ............................. 428/35.7, 36.8, 428/36.9, 474.9, 423.5, 903.3

(56) References Cited

U.S. PATENT DOCUMENTS

| | | | |
|---|---|---|---|
| 5,219,003 A | 6/1993 | Kerschbaumer | ............. 138/137 |
| 5,404,915 A | 4/1995 | Muegge et al. | ............. 138/137 |
| 5,798,048 A | 8/1998 | Ries | ............. 210/767 |
| 5,869,190 A | 2/1999 | Stoeppelmann | .......... 428/474.4 |
| 6,177,162 B1 | 1/2001 | Siour et al. | ............. 428/36.91 |
| 6,335,101 B1 | 1/2002 | Haeger et al. | ........... 428/475.2 |
| 6,355,358 B1 * | 3/2002 | Boer et al. | ............... 428/474.4 |
| 6,451,395 B1 | 9/2002 | Ries et al. | ................. 428/36.8 |

FOREIGN PATENT DOCUMENTS

| | | |
|---|---|---|
| CN | 1290601 | 4/2001 |
| CZ | 2000002436 | 2/2001 |
| DE | 40 06 870 C1 | 7/1991 |
| DE | 10005641 | 1/2001 |
| EP | 0 435 787 | 7/1991 |
| EP | 0 464 271 A1 | 1/1992 |
| EP | 0 731 308 A1 | 9/1996 |
| EP | 0 735 098 | 10/1996 |
| EP | 0742096 | * 11/1996 |
| EP | 1 031 411 | 8/2000 |
| EP | 1065048 | 1/2001 |
| GB | 2000-002904 | 1/2001 |
| JP | 2001071436 | 3/2001 |
| KR | 2001049644 | 6/2001 |
| WO | WO 99/46333 | 9/1999 |

OTHER PUBLICATIONS

Derwent Search Result for patent family of U.S. 6,355,358.
U.S. patent application Ser. No. 10/024,379, Ries et al., filed Dec. 21, 2001.
U.S. patent application Ser. No. 10/681,279, Schmitz et al., filed Oct. 9, 2003.
U.S. patent application Ser. No. 09/079,696, Ries et al., filed May 15, 1998.
U.S. patent application Ser. No. 09/886,217, Bartz et al., filed Jun. 22, 2001.
U.S. patent application Ser. No. 10/024,386, Schmitz et al., filed Dec. 21, 2001.
U.S. patent application Ser. No. 10/024,379, Ries et al., filed Dec. 21, 2001.

* cited by examiner

*Primary Examiner*—Harold Pyon
*Assistant Examiner*—Marc A Patterson
(74) *Attorney, Agent, or Firm*—Oblon, Spivak, McClelland, Maier & Neustadt, P.C.

(57) ABSTRACT

A good layer adhesion can be achieved in a composite having two or more layers wherein
- a layer I is obtained from a molding composition which has the following components:
  - a) from 0 to 80 parts by weight of a polyamide selected from the group consisting of PA6, PA66, PA6/66 and a mixture thereof;
  - b) from 0.05 to 100 parts by weight of a polyamine-polyamide copolymer; and
  - c) from 0 to 80 parts by weight of a polyamide selected from the group consisting of PA11, PA12, PA612, PA1012, PA1212 and a mixture thereof;
- wherein a total of the parts by weight of components a), b) and c) is 100;
- wherein at least 20 parts by weight of components a) and b) is a monomer unit which is obtained from caprolactam and/or from a combination of hexamethylenediamine/adipic acid; and
- wherein at least 20 parts by weight of components b) and c) is a monomer unit which is obtained from ω-aminoundecanoic acid, laurolactam, a mixture of hexamethylenediamine and 1,12-dodecanedioic acid, a mixture of 1,10-decanediamine and 1,12-dodecanedioic acid, and/or a mixture of 1,12-dodecanediamine and 1,12-dodecanedioic acid.

37 Claims, No Drawings

POLYAMIDE COMPOSITE HAVING TWO OR MORE LAYERS

BACKGROUND OF THE INVENTION

1. Field of the Invention

The invention relates to a composite having two or more layers wherein at least one of the layers is obtained from a polyamide blend.

2. Discussion of the Background

Composites having two or more layers may be used, for example, as a tube for conveying liquids or gases in motor vehicles. The used molding compositions have to have adequate chemical resistance to the fluids conducted, and they have to be stable under all of the mechanical requirements placed upon them, even after long exposure to fuels, oil or heat. Molding compositions based on polyamide have proved successful. However, the composite having two or more layers is subject not only to effects due to the fluid to be conveyed, but also to external effects. Examples of such effects, in the case of tubes laid in the underbody region of motor vehicles, are the action of atmospheric moisture, water spray, road salts, underbody protection, greases and oils. For this reason, the only materials which can be used for tubes of this type are polyamide molding compositions based on PA11, PA12, PA612, PA1012 or PA1212. Although other polyamides, e.g. PA6, PA66 or PA6/66, would cope with exposure to the fluid to be conveyed, and would also have low cost, they have relatively low impact strength and high water absorption, associated with swelling and therefore unacceptable dimensional changes. In addition, PA6 is not sufficiently resistant to zinc chloride. At least the outer layer, therefore, cannot be composed of polyamides of this type.

DE 40 06 870 C1 describes a fuel line intended for motor vehicles which is composed of at least three layers made from at least two different mutually compatible polyamides. This patent discloses that different polyamides have different diffusion profiles for each component of fuel. Therefore, combining different polyamide layers can reduce total fuel permeation.

DE-40 06 870 C1 maintains that PA66 is sufficiently compatible with PA11 or PA12 and that no delamination is observed in piping made from layers of this type. However, this was not confirmed when the work was repeated. Instead, it was found that two coextruded layers one of which is composed of PA11, PA12, PA612, PA1012, or PA1212 and the other is composed of PA6, PA66, or PA6/66, have either no adhesion at all to one another or the adhesion is far from sufficient to give a composite free from delamination over long periods.

EP-A-0 731 308 acknowledges the problem of lack of adhesion between layers made from different polyamides. It discloses a coextruded tube having two or more layers. An outer layer is composed of a PA11 molding composition and an inner layer is mainly composed of PA6. The layers are bonded by a polyolefin-based adhesion promoter.

However, the automotive industry has for some time required increased stability at relatively high temperature. This excludes solutions which include a polyolefin layer, since it has a low heat resistance.

It has also been found that prolonged contact with alcohol-containing fuel, in particular in the presence of heat, rapidly reduces layer adhesion between functionalized polyolefin and polyamide. This adhesion finally falls to values which are unacceptable in industry. The cause of this is thought to be an alcoholysis or hydrolysis reaction.

SUMMARY OF THE INVENTION

It is therefore an object of the present invention to provide a composite having two or more layers at least one of which is based on polyamide, wherein all of the layers have an adequate heat resistance.

Another object is to combine two or more layers without the use of a polyolefin layer as adhesion promoter. Combined are a) a layer made from a relatively low-cost polyamide and b) a layer made from a polyamide which has particularly good mechanical properties and low water absorption and is not sensitive to environmental effects.

Yet another object is to combine two polyamide layers in a composite having two or more layers. Each of the polyamide layers have different barrier action for the different constituents of a mixture of solvents or fuels. These polyamide layers should have firm bonding to one another via a suitable adhesion promoter.

A further object is to provide a polyamide-based composite having two or more layers, wherein the adhesion between the layers is very substantially retained even after prolonged contact with alcohol-containing or aqueous media in the presence of heat.

These and other objects have been achieved by the present invention, the first embodiment of which includes a composite having two or more layers and comprising:
 a layer I obtained from a molding composition comprising:
  a) from 0 to 80 parts by weight of a polyamide selected from the group consisting of PA6, PA66, PA6/66 and a mixture thereof;
  b) from 0.05 to 100 parts by weight of a polyamine-polyamide copolymer prepared from the following monomers:
   α) from 0.5 to 25% by weight, based on the polyamine-polyamide copolymer, of a polyamine having at least 4 nitrogen atoms and having a number-average molecular weight $M_n$ of at least 146 g/mol, and
   β) a polyamide-forming monomer selected from the group consisting of a lactam, a ω-aminocarboxylic acid, an equimolar combination of a diamine and a dicarboxylic acid and a mixture thereof; and
  c) from 0 to 80 parts by weight of a polyamide selected from the group consisting of PA11, PA12, PA612, PA1012, PA1212 and a mixture thereof;
 wherein a total of the parts by weight of components a), b) and c) is 100;
 wherein at least 20 parts by weight of components a) and b) is a monomer unit which is obtained from caprolactam and/or from a combination of hexamethylenediamine/adipic acid; and
 wherein at least 20 parts by weight of components b) and c) is a monomer unit which is obtained from ω-aminoundecanoic acid, laurolactam, a mixture of hexamethylenediamine and 1,12-dodecanedioic acid, a mixture of 1,10-decanediamine and 1,12-dodecanedioic acid, and/or a mixture of 1,12-dodecanediamine and 1,12-dodecanedioic acid.

In another embodiment the present invention includes a composite having two or more layers and comprising:
 a layer I obtained from a molding composition comprising:

a) from 0 to 80 parts by weight of a polyamide selected from the group consisting of PA6, PA66, PA6/66 and a mixture thereof;

b) from 0 to 100 parts by weight of a polyamine-polyamide copolymer prepared from the following monomers:

α) from 0.5 to 25% by weight, based on the polyamine-polyamide copolymer, of a polyamine having at least 4 nitrogen atoms and having a number-average molecular weight $M_n$ of at least 146 g/mol, and β) a polyamide-forming monomer selected from the group consisting of a lactam, a ω-aminocarboxylic acid, an equimolar combination of a diamine and a dicarboxylic acid and a mixture thereof; and c) from 0 to 80 parts by weight of a polyamide selected from the group consisting of PA11, PA12, PA612, PA1012, PA1212 and a mixture thereof;

wherein a total of the parts by weight of components a), b) and c) is 100;

wherein at least 20 parts by weight of components a) and b) is a monomer unit which is obtained from caprolactam and/or from a combination of hexamethylenediamine/adipic acid; and wherein at least 20 parts by weight of components b) and c) is a monomer unit which is obtained from ω-aminoundecanoic acid, laurolactam, a mixture of hexamethylenediamine and 1,12-dodecanedioic acid, a mixture of 1,10-decanediamine and 1,12-dodecanedioic acid, and/or a mixture of 1,12-dodecanediamine and 1,12-dodecanedioic acid;

wherein the molding composition of layer I is obtained by subjecting a blend comprising polyamide a) and polyamide c) to solid-phase post-condensation.

Yet another embodiment of the present invention includes a composite having two or more layers and comprising:

a layer I obtained from a molding composition comprising:

a) from 0 to 80 parts by weight of a polyamide selected from the group consisting of PA6, PA66, PA6/66 and a mixture thereof;

b) from 0 to 100 parts by weight of a polyamine-polyamide copolymer prepared from the following monomers:

α) from 0.5 to 25% by weight, based on the polyamine-polyamide copolymer, of a polyamine having at least 4 nitrogen atoms and having a number-average molecular weight $M_n$ of at least 146 g/mol, and β) a polyamide-forming monomer selected from the group consisting of a lactam, a ω-aminocarboxylic acid, an equimolar combination of a diamine and a dicarboxylic acid and a mixture thereof; and c) from 0 to 80 parts by weight of a polyamide selected from the group consisting of PA11, PA12, PA612, PA1012, PA1212 and a mixture thereof;

wherein a total of the parts by weight of components a), b) and c) is 100;

wherein at least 20 parts by weight of components a) and b) is a monomer unit which is obtained from caprolactam and/or from a combination of hexamethylenediamine/adipic acid; and wherein at least 20 parts by weight of components b) and c) is a monomer unit which is obtained from ω-aminoundecanoic acid, laurolactam, a mixture of hexamethylenediamine and 1,12-dodecanedioic acid, a mixture of 1,10-decanediamine and 1,12-dodecanedioic acid, and/or a mixture of 1,12-dodecanediamine and 1,12-dodecanedioic acid;

wherein either polyamide a) or c) contains an excess of amino end groups and the other polyamide contains an excess of carboxyl end groups.

The present invention also includes a composite having two or more layers and comprising:

a layer I obtained from a molding composition comprising:

a) from 0 to 80 parts by weight of a polyamide selected from the group consisting of PA6, PA66, PA6/66 and a mixture thereof;

b) from 0 to 100 parts by weight of a polyamine-polyamide copolymer prepared from the following monomers:

α) from 0.5 to 25% by weight, based on the polyamine-polyamide copolymer, of a polyamine having at least 4 nitrogen atoms and having a number-average molecular weight $M_n$ of at least 146 g/mol, and β) a polyamide-forming monomer selected from the group consisting of a lactam, a ω-aminocarboxylic acid, an equimolar combination of a diamine and a dicarboxylic acid and a mixture thereof; and c) from 0 to 80 parts by weight of a polyamide selected from the group consisting of PA11, PA12, PA612, PA1012, PA1212 and a mixture thereof;

wherein a total of the parts by weight of components a), b) and c) is 100;

wherein at least 20 parts by weight of components a) and b) is a monomer unit which is obtained from caprolactam and/or from a combination of hexamethylenediamine/adipic acid; and wherein at least 20 parts by weight of components b) and c) is a monomer unit which is obtained from ω-aminoundecanoic acid, laurolactam, a mixture of hexamethylenediamine and 1,12-dodecanedioic acid, a mixture of 1,10-decanediamine and 1,12-dodecanedioic acid, and/or a mixture of 1,12-dodecanediamine and 1,12-dodecanedioic acid;

wherein components a) and c) are linked by adding a reactive compound which links the polyamide end groups to one another.

DETAILED DESCRIPTION OF THE INVENTION

The present invention relates to a composite having two or more layers, wherein a layer comprises I. a layer I made from a molding composition which comprises the following components:

a) from 0 to 80 parts by weight of a polyamide selected from the group consisting of PA6, PA66, PA6/66 and a mixture thereof, b) from 0.05 to 100 parts by weight of a polyamine-polyamide copolymer and c) from 0 to 80 parts by weight of a polyamide selected from the group consisting of PA11, PA12, PA612, PA1012, PA1212 and a mixture thereof, wherein the total of the parts by weight of components a), b) and c) is 100, and wherein at least 20 parts by weight of components a) and b) is a monomer unit which is obtained from caprolactam and/or from the combination hexamethylenediamine/adipic acid; and wherein at least 20 parts by weight of components b) and c) is a monomer unit obtained from ω-aminoundecanoic acid, laurolactam, a mixture of hexamethylenediamine and 1,12-dodecanedioic acid, a mixture of 1,10-decanediamine and 1,12-dodecanedioic acid, and/or a mixture of 1,12-dodecanediamine and 1,12-dodecanedioic acid.

The molding composition of layer I preferably comprises at least 0.5 part by weight, particularly preferably at least 10 parts by weight, more preferably at least 20 parts by weight, and most preferably at least 30 parts by weight of component a). The upper limit of the content of component a) is preferably 70 parts by weight, and particularly preferably 60 parts by weight.

The molding composition of layer I preferably comprises at least 0.5 part by weight, particularly preferably at least 2 parts by weight, more preferably at least 5 parts by weight, and most preferably at least 10 parts by weight of component b). Component b) may be present in an amount of at least 0.05, 0.1, 0.5, 1, 2, 3, 4, 5, 6, 7, 8, 9 and 10 parts by weight. The upper limit of the content of component b) is preferably 80 parts by weight, more preferably 60 parts by weight, and most preferably 40 parts by weight. The corresponding molding compositions are likewise provided by the present invention.

The molding composition of layer I preferably comprises at least 0.5 part by weight, particularly preferably at least 10 parts by weight, more preferably at least 20 parts by weight, and most preferably at least 30 parts by weight, of component c). The upper limit is preferably 70 parts by weight, and particularly preferably 60 parts by weight.

In a preferred first embodiment, the composite having two or more layers comprises, in addition to the layer I, at least
II. a layer II obtained from a molding composition based on PA11, PA12, PA612, PA1012, and/or PA1212.

In a preferred second embodiment, adjacent to the layer I there is also the following layer:
a layer III obtained from a molding composition based on PA6, PA66, and/or PA6/66, the layer sequence in the composite being I/III or II/I/III, for example. The outer layer is preferably formed by I or II in the case of applications in which there is seen to be a difference between the outer layer and the inner layer.

In a preferred third embodiment, the composite having two or more layers has a symmetrical structure and the layer sequence is II/I/II or II/I/III/I/II, for example.

In a fourth preferred embodiment, at least one of the layers of the composite has been rendered electrically conductive in order to dissipate electrostatic charges generated by a moving fluid. This is preferably the layer directly in contact with the moving fluid.

In a fifth preferred embodiment, there is another layer which has been rendered electrically conductive, firmly adhering to the layers of the composite.

In a sixth preferred embodiment, the composite having two or more layers also comprises a regrind layer. When composites of the invention are produced, waste constantly arises, for example, from the start-up procedure on the extrusion plant, or in the form of flash during extrusion blow molding, or during finishing processes on tubes. There may be a regrind layer made from these wastes which is embedded, for example, between layer I and layer II.

The above and other embodiments may be combined with one another in any desired manner. In all of these cases, firm adhesion is achieved between the layers. The composite having two or more layers may, if required, also comprise other layers, for example, a layer with barrier action with respect to gases or fuel components, which not necessarily composed of polyamide. Any layer exhibiting such barrier action may be used.

In another embodiment, the layer I is a blend made from components a) and c). These polymers are substantially incompatible with one another. Thus, preparation of the blend at conventional processing temperatures only gives adequate compatibility within a relatively narrow compositional range. Better results are obtained if the polyamide blend is prepared under conditions under which the two polyamides react with one another at least partially via the end groups or via transamidation reactions, to give block copolymers. The temperatures needed for this are generally above 250° C., preferably above 280° C., and particularly preferably above 300° C. The presence of a catalyst, such as hypophosphorous acid, dibutyltin oxide, triphenylphosphine, or phosphoric acid, is optional. It is also possible to start from a polyamide blend initially prepared under conventional processing conditions which is then subjected to solid-phase postcondensation under conditions usual for polyamides, generally at temperatures of from 140° C. to about 5 K below the crystalline melting point $T_m$, more preferably at temperatures of from 150° C. to about 10 K below $T_m$, using reaction times of from 2 to 48 hours, preferably of from 4 to 36 hours, and particularly preferably of from 6 to 24 hours.

It is particularly preferred that one of the polyamides contains an excess of amino end groups and that the other polyamide contains an excess of carboxyl end groups.

Finally, components a) and c) may also be linked by adding a reactive compound which preferably links the polyamide end groups to one another, for example, a bisoxazoline, biscarbodiimide, bismaleimide, bisanhydride, diisocyanate, or corresponding compounds having three or more functional groups.

Another way of making components a) and c) compatible with one another is to add an effective amount of component b).

More details of each component are given below.

PA6 is prepared by ring-opening polymerization of caprolactam.

PA66 is prepared by polycondensation of hexamethylenediamine and adipic acid. Exactly as with PA6, there is a wide variety of commercially available grades.

PA6/66 is a copolycondensate based on the monomers caprolactam, hexamethylendiamine, and adipic acid.

The polyamine-polyamide copolymer is prepared using the following monomers:
a) from 0.5 to 25% by weight, preferably from 1 to 20% by weight, and particularly preferably from 1.5 to 16% by weight, based on the polyamine-polyamide copolymer, of a polyamine having at least 4, preferably at least 8, and particularly preferably at least 11, nitrogen atoms and having a number-average molar mass $M_n$ of at least 146 g/mol, preferably at least 500 g/mol, and particularly preferably at least 800 g/mol, and
b) a polyamide-forming monomer selected from the group consisting of a lactam, a ω-aminocarboxylic acid, and/or an equimolar combination of diamine and dicarboxylic acid.

In one preferred embodiment, the amino group concentration in the polyamine-polyamide copolymer is in the range from 100 to 2 500 mmol/kg. The amino group concentration includes all values and subvalues therebetween, especially including 200, 300, 400, 500, 600, 700, 800, 900, 1000, 1100, 1200, 1300, 1400, 1500, 1600, 1700, 1800, 1900, 2000, 2100, 2200, 2300 and 2400 mmol/kg.

Examples of the classes of substances which may be used as polyamine are:

polyvinylamines (Römpp Chemie-Lexikon [Römpp's Chemical Encyclopedia], 9th edition, Volume 6, p. 4921, Georg Thieme Verlag Stuttgart 1992);

polyamines prepared from alternating polyketones (DE-A 196 54 058);

dendrimers, such as ((H$_2$N—(CH$_2$)$_3$)$_2$N—(CH$_2$)$_3$)$_2$—N(CH$_2$)$_2$—N((CH$_2$)$_2$—N((CH$_2$)$_3$—NH$_2$)$_2$)$_2$ (DE-A-196 54 179), or tris(2-aminoethyl)amine, N,N-bis(2-aminoethyl)-N',N'-bis[2-[bis(2-aminoethyl)amino]ethyl]-1,2-ethanediamine, 3,15-bis(2-aminoethyl)-6,12-bis[2-[bis(2-aminoethyl)amino]ethyl]-9-[bis[2-bis(2-aminoethyl)amino]ethyl]amino]ethyl]-3,6,9,12,15-pentaazaheptadecane-1,17-diamine (J. M. Warakomski, Chem. Mat. 1992, 4, 1000–1004);

linear polyethyleneimines which can be prepared by polymerizing 4,5-dihydro-1,3-oxazoles, followed by hydrolysis (Houben-Weyl, Methoden der Organischen Chemie [Methods of organic chemistry], Volume E20, pp. 1482–1487, Georg Thieme Verlag Stuttgart, 1987);

branched polyethyleneimines obtained by polymerizing aziridines (Houben-Weyl, Methoden der Organischen Chemie [Methods of organic chemistry], Volume E20, pp. 1482–1487, Georg Thieme Verlag Stuttgart, 1987) and generally having the following distribution of amino groups:

from 25 to 46% of primary amino groups,
from 30 to 45% of secondary amino groups, and
from 16 to 40% of tertiary amino groups.

Preferably, the polyamine has a number-average molecular weight $M_n$ of not more than 20 000 g/mol, more preferably not more than 10 000 g/mol, and most preferably not more than 5 000 g/mol.

Lactams and, respectively, ω-aminocarboxylic acids which may be used as polyamide-forming monomers contain from 4 to 19 carbon atoms, in particular from 6 to 12 carbon atoms. Particular preference is given to the use of ε-caprolactam, ε-aminocaproic acid, capryllactam, ω-aminocaprylic acid, laurolactam, ω-aminododecanoic acid, and/or ω-aminoundecanoic acid.

Examples of combinations of diamine and dicarboxylic acid are hexamethylenediamine/adipic acid, hexamethylenediamine/dodecanedioic acid, octamethylenediamine/sebacic acid, decamethylenediamine/sebacic acid, decamethylenediamine/dodecanedioic acid, dodecamethylenediamine/dodecanedioic acid, and dodecamethylenediamine/2,6-naphthalenedicarboxylic acid. It is also possible to use any other combination, such as decamethylenediamine/dodecanedioic acid/terephthalic acid, hexamethylenediamine/adipic acid/terephthalic acid, hexamethylenediamine/adipic acid/caprolactam, decamethylenediamine/dodecanedioic acid/ω-aminoundecanoic acid, decamethylenediamine/dodecanedioic acid/laurolactam, decamethylenediamine/terephthalic acid/laurolactam, or dodecamethylenediamine/2,6-naphthalenedicarboxylic acid/laurolactam.

In one preferred embodiment, the polyamine-polyamide copolymer is prepared with the additional use of an oligocarboxylic acid such as dicarboxylic acid, tricarboxylic acid, tetracarboxylic acid. It is preferable to use from 0.015 to about 3 mol % of dicarboxylic acid or from 0.01 to about 1.2 mol % of tricarboxylic acid, based in each case on the entirety of the polyamide-forming monomers left over. When the equivalent combination of diamine and dicarboxylic acid is used, calculation of the above proportions includes each of these monomers individually. If use is made of a dicarboxylic acid, it is preferable to use from 0.03 to 2.2 mol %, particularly preferably from 0.05 to 1.5 mol %, more preferably from 0.1 to 1 mol %, and most preferably from 0.15 to 0.65 mol %. If use is made of a tricarboxylic acid, it is preferable to use from 0.02 to 0.9 mol %, particularly preferably from 0.025 to 0.6 mol %, more preferably from 0.03 to 0.4 mol %, and most preferably from 0.04 to 0.25 mol %. The concomitant use of the oligocarboxylic acid markedly improves resistance to solvents and to fuel, in particular resistance to hydrolysis and alcoholysis.

The oligocarboxylic acid used may be any di- or tricarboxylic acid having from 6 to 24 carbon atoms, for example adipic acid, suberic acid, azelaic acid, sebacic acid, dodecanedioic acid, isophthalic acid, 2,6-naphthalenedicarboxylic acid, cyclohexane-1,4-dicarboxylic acid, trimesic acid, and/or trimellitic acid.

Regulators may also be used. Preferred are aliphatic, alicyclic, aromatic, aralkylic, and/or alkylaryl-substituted monocarboxylic acids having from 3 to 50 carbon atoms, for example lauric acid, unsaturated fatty acids, acrylic acid, or benzoic acid. Use of these regulators can reduce the concentration of amino groups without altering the form of the molecule. This method can also introduce functional groups, such as double or triple bonds, etc. It is preferable for the polyamine-polyamide copolymer to have a substantial proportion of amino groups. The amino group concentration in the copolymer is preferably in the range from 150 to 1 500 mmol/kg, more preferably in the range from 250 to 1 300 mmol/kg, and most preferably in the range from 300 to 1 100 mmol/kg. Amino groups are understood to be not only amino end groups, but also any secondary or tertiary amine functions which may be present in the polyamine.

The composition of the polyamide fraction within the polyamine-polyamide copolymer may vary within a very wide range, because compatibility with the polyamides of components a) and c) is usually present, this apparently is determined by other factors.

The polyamine-polyamide copolymers may be prepared by a variety of processes.

One way is to charge the polyamide-forming monomers and the polyamine together and to carry out the polymerization and, respectively, the polycondensation. The oligocarboxylic acid may be added either at the start or during the course of the reaction.

However, a preferred process has two stages in which first the lactam cleavage and prepolymerization is carried out in the presence of water (an alternative being the direct use and prepolymerization of the corresponding ω-aminocarboxylic acids and, respectively, diamines and dicarboxylic acids). The polyamine is metered in during the second step, and the oligocarboxylic acid which optionally may be used concomitantly is metered in during or after the prepolymerization. The pressure of the mixture is then reduced at temperatures of from 200 to 290° C., and polycondensation takes place in a stream of nitrogen or in vacuo.

Another preferred process is hydrolytic degradation of a polyamide to give a prepolymer and simultaneous or subsequent reaction with the polyamine. The used polyamides are preferably those in which the end-group difference is approximately zero, or in which the optionally used oligocarboxylic acid has previously been incorporated by polycondensation. However, the oligocarboxylic acid may also be added at the start of, or during the course of, the degradation reaction.

These processes can yield polyamides with an ultrahigh level of branching and with acid values below 40 mmol/kg, preferably below 20 mmol/kg, and particularly preferably below 10 mmol/kg. Approximately complete conversion is achieved after as little as from one to five hours of reaction time at temperatures of from 200° C. to 290° C. The reacting temperature includes all values and subvalues therebetween, especially including 210, 220, 230, 240, 250, 260, 270 and 280° C.

If desired, a vacuum phase lasting a number of hours may be appended as another step of the process. This phase takes at least four hours, preferably at least six hours, and particularly preferably at least eight hours, at from 200 to 290° C. After an induction period of a number of hours, an increase in melt viscosity is then observed. This is likely to be attributable to a reaction of amino end groups with one another, with cleavage of ammonia and chain-linkage. This further increases the molecular weight, which is particularly advantageous for extrusion molding compositions.

If there is a desire not to complete the reaction in the melt, solid-phase postcondensation of the polyamine-polyamide copolymer is also possible.

PA11 is prepared by polycondensation of ω-aminoundecanoic acid, while PA12 is obtained by ring-opening polymerization of laurolactam. A wide variety of grades of both of these polymers is available commercially.

PA612 is prepared in a known manner by polycondensation of an equivalent mixture of hexamethylenediamine and 1,12-dodecanedioic acid. PA1012 is prepared by polycondensation of an equivalent mixture of 1,10-decanediamine and 1,12-dodecanedioic acid, while PA1212 is obtained in the same manner from 1,12-dodecanediamine and 1,12-dodecanedioic acid.

Mixtures of different polyamides may also be used, e.g. PA12/PA1012 or PA12/PA1212. Mixtures of this type have particularly high low-temperature impact strength. They are described in the Examples of EP-A-0 388 583.

In particular, if the composite having two or more layers is to be used as packaging for food or drink, it is preferred to use a copolyamide in layer I or layer II instead of the homopolyamide, in order to lower the melting point and to make the layer heat-sealable. A wide selection of preferred comonomers is available to the skilled worker, e.g. caprolactam, laurolactam, or the equimolar combination of a $C_6$–$C_{12}$ diamine with a $C_6$–$C_{12}$ dicarboxylic acid.

The polyamide molding compositions used may comprise not more than about 50% by weight of an additive selected from impact-modifying rubber and/or from a conventional auxiliary and an additive.

Impact-modifying rubbers for polyamide molding compositions contain functional groups from unsaturated functional compounds which have either been incorporated into the main chain by polymerization or have been grafted onto the main chain. Preferably, EPM rubber and EPDM rubber are used, grafted with maleic anhydride by a free-radical route. Rubbers of this type may also be used together with an unfunctionalized polyolefin, e.g. isotactic polypropylene, as described in EP-A-0 683 210.

The molding compositions may also comprise relatively small amounts of an auxiliary or additive needed for establishing particular properties. Preferred examples of these are plasticizers, pigments or fillers, such as carbon black, titanium dioxide, zinc sulfide, silicates or carbonates, processing aids, such as waxes, zinc stearate or calcium stearate, flame retardants, such as magnesium hydroxide, aluminum hydroxide, or melamine cyanurate, glass fibers, antioxidants, UV stabilizers, and also additives which give the product antistatic properties or electrical conductivity, e.g. carbon fibers, graphite fibrils, stainless steel fibers, or conductivity black.

In one preferred embodiment the molding composition comprises from 1 to 25% by weight of plasticizer, more preferably from 2 to 20% by weight, and most preferably from 3 to 15% by weight.

A general overview of plasticizers suitable for polyamides can be found in Gächter/Müller, Kunststoffadditive [Plastics additives], C. Hanser Verlag, 2nd edition, p.296.

Preferred examples of plasticizers are esters of p-hydroxybenzoic acid having from 2 to 20 carbon atoms in the alcohol component, and amides of arylsulfonic acids having from 2 to 12 carbon atoms in the amine component, preferably amides of benzenesulfonic acid.

Preferred examples of plasticizers are ethyl p-hydroxybenzoate, octyl p-hydroxybenzoate, isohexadecyl p-hydroxybenzoate, N-n-octyltoluenesulfonamide, N-n-butylbenzenesulfonamide, and N-2-ethylhexylbenzenesulfonamide.

One embodiment of the composite of the invention, having two or more layers, is a tube, a filler pipe, or a container, in particular for transporting or storing liquids or gases. A tube of this type may be of straight or corrugated design, or may merely have corrugated sections. Corrugated tubes are described, for example, in U.S. Pat. No. 5,460,771. Important applications of composites of this type having two or more layers are their use as fuel piping, as filler pipes for tanks, as vapor lines (i.e. piping which conveys fuel vapors, e.g. ventilation piping), as fuel-pump piping, as coolant piping, as air-conditioner piping, or as fuel containers.

The composite of the invention, having two or more layers, may also be a flat composite, such as a film, e.g. a packaging film for food or drink.

When the composite of the invention having two or more layers is used for carrying or storing a combustible liquid, gas or dust, e.g. fuel or fuel vapor, it is preferable for one of the layers of the composite, or an additional internal layer, to be rendered electrically conductive. This may be achieved by compounding with an electrically conductive additive by any known method. Preferred examples of conductive additives are conductivity black, metal flakes, metal powders, metallized glass beads, metallized glass fibers, metal fibers (such as those made from stainless steel), metallized whiskers, carbon fibers (including metallized carbon fibers), intrinsically conductive polymers, or graphite fibrils. It is also possible to use mixtures of various conductive additives.

In the preferred case, the electrically conductive layer is in direct contact with the medium to be conveyed or to be held, and its surface resistivity is not more than $10^9$ Ω/square. The test method for determining resistance in tubes having two or more layers is explained in SAE J 2260 (November 1996, paragraph 7.9).

If the composite of the invention having two or more layers, is designed as a hollow article or hollow profile (e.g. tube) it may also have an additional outer elastomer coating. Preferred materials for the outer coating process are either crosslinking rubber compositions or thermoplastic elastomers. The outer coating may be applied to the tube either with or without the use of an additional adhesion promoter, for example, by way of extrusion via a crosshead die, or by passing a prefabricated elastomer hose over the finished extruded tube having two or more layers. The thickness of the outer coating is generally from 0.1 to 4 mm, preferably from 0.2 to 3 mm. The thickness of the outer coating includes all values and subvalues therebetween, especially including 0.2, 0.5, 1., 1.5, 2.0, 2.5, 3.0 and 3.5 mm.

Examples of preferred elastomers are chloroprene rubber, ethylene-propylene rubber (EPM), ethylene-propylenediene rubber (EPDM), epichlorohydrin rubber (ECO), chlorinated polyethylene, acrylate rubber, chlorosulfonated polyethylene, silicone rubber, plasticized PVC, polyetheresteramides and polyetheramides.

The composite having two or more layers may be manufactured in one or more stages, for example, by single-stage processes using multicomponent injection molding or coextrusion or coextrusion blow molding (including, for example, 3D blow molding, parison extrusion into an open half of a mold, 3D parison manipulation, suction blow molding, 3D suction blow molding, or sequential blow molding), or by processes having two or more stages, e.g. as described in U.S. Pat. No. 5,554,425.

Having generally described this invention, a further understanding can be obtained by reference to certain specific examples which are provided herein for purposes of illustration only, and are not intended to be limiting unless otherwise specified.

EXAMPLES

The following components and molding compositions were used in the examples:

| | |
|---|---|
| VESTAMID ® X7293, | a plasticized and impact-modified extrusion molding composition based on PA12 from Degussa AG, Düsseldorf |
| VESTAMID ® ZA7295, | an extrusion molding composition made from PA12 from Degussa AG, Düsseldorf |
| ULTRAMID ® B4, | a PA6 from BASF AG, Ludwigshafen |
| ULTRAMID ® B5W, | a PA6 from BASF AG, Ludwigshafen |
| VESTAMID ® D22, | a high-viscosity PA612 from Degussa AG, Düsseldorf |

Polyethyleneimine-PA6 copolymer:

4.78 kg of caprolactam were melted in a heating vessel at from 180 to 210° C., and transferred to a pressure-tight polycondensation vessel. 250 ml of water and 57 ppm of hypophosphorous acid were then added. Caprolactam cleavage was carried out at 280° C. under autogenic pressure. The pressure was then reduced within a period of 3 h to a residual water vapor pressure of 3 bar, and 230 g of polyethyleneimine (LUPASOL® G 100, BASF AG, Ludwigshafen) were added. The pressure was then reduced to atmospheric pressure, and polycondensation took place at 250° C. for 2 h, under a stream of nitrogen. The clear melt was discharged as extrudate through a melt pump, cooled in a water bath, and then pelletized. The resultant copolymer had a polyethyleneimine fraction of 4.5% by weight and a PA6 fraction of 95.5% by weight.

Example 1

A Berstorff ZE 25 twin-screw extruder was used to prepare an intimate mixture of 6.1 kg of VESTAMID® D22, 9.0 kg of ULTRAMID® B5W and 2.0 kg of the polyethyleneimine-PA6 copolymer at 280° C. and the mixture was extruded, pelletized and dried.

This mixture was used to coextrude a three-layer tube with external diameter 8 mm and total wall thickness 1 mm. The outer layer of this tube was composed of VESTAMID® D22, the intermediate layer was composed of the mixture prepared at the outset, and the inner layer was composed of ULTRAMID® B4. Permanent adhesion was achieved here at both of the phase boundaries.

Example 2

A Berstorff ZE 25 twin-screw extruder was used to prepare an intimate mixture of 8.1 kg of VESTAMID® ZA7295 and 9.0 kg of ULTRAMID® B4 at 320° C. and the mixture was extruded, pelletized and dried. Some extent of transamidation reactions leading to block copolymers was observed here.

This mixture was used to produce a three-layer tube with external diameter 8 mm and total wall thickness 1 mm. The outer layer of this tube was composed of VESTAMID® X7293, the intermediate layer was composed of the mixture prepared at the outset, and the inner layer was composed of ULTRAMID® B4. Permanent adhesion was achieved here at both of the phase boundaries.

German patent application 10064334.5, filed Dec. 21, 2000, is incorporated herein by reference.

Obviously, numerous modifications and variations on the present invention are possible in light of the above teachings. It is therefore to be understood that within the scope of the appended claims, the invention may be practiced otherwise than as specifically described herein.

What is claimed is:

1. A composite having two or more layers and comprising:
   a layer I obtained form a molding composition comprising:
   a) from 0 to 80 parts by weight of a polyamide selected from the group consisting of polyamide 6, polyamide 66, polyamide 6/66 and a mixture thereof;
   b) from 0.05 to 100 parts by weight of a polyamine-polyamide copolymer prepared from the following monomers:
      α) from 0.5 to 25% by weight, based on the polyamine-polyamide copolymer, of a polyamine having at least 4 nitrogen atoms and having a number-average molecular weight $M_n$ of at least 146 g/mol, and
      β) a polyamide-forming monomer selected from the group consisting of a lactam, a ω-aminocarboxylic acid, an equimolar combination of a diamine and a dicarboxylic acid and a mixture thereof; and
   c) from 0 to 80 parts by weight of a polyamide selected from the group consisting of polyamide 11, polyamide 12, polyamide 612, polyamide 1012, polyamide 1212 and a mixture thereof;
   wherein a total of the parts by weight of components a), b) and c) is 100;
   wherein a total amount of said polyamide a) and said polyamine-polyamide b) contains at least 20 parts by weight of a monomer unit which is obtained
   i) by ring-opening polymerization of caprolactam, or
   ii) by polycondensing hexamethylenediamine and adipic acid or
   iii) by copolycondensing caprolactam, hexamethylenediamine and adipic acid; and
   wherein a total of said polyamine-polyamide b) and said polyamide c) contains at least 20 parts by weight of a monomer unit which is obtained by polycondensing of ω-aminoundecanoic acid, or ring-opening and polycondensing of laurolactam or polycondensing of at least one of the following mixtures: a mixture of hexamethylenediamine and 1, 12 dodecanedioic acid, a mixture of 1, 10 decanediamine and 1, 12 dodecanedioic acid, a mixture of 1, 12 dodecanediamine and 1, 12 dodecanedioic acid.

2. The composite according to claim 1, wherein the molding composition of layer I comprises:
   a member selected from the group consisting of at least 0.5 part by weight of component a), at least 0.5 part by weight of component b), at least 0.5 part by weight of component c) and mixtures thereof.

3. The composite according to claim 1, wherein the molding composition of layer I comprises:
a member selected from the group consisting of at least 10 parts by weight of component a), at least 2 parts by weight of component b), at least 10 parts by weight of component c), and mixtures thereof.

4. The composite according to claim 1, wherein the molding composition of layer I comprises:
a member selected from the group consisting of at least 20 parts by weight of component a), at least 5 parts by weight of component b), at least 20 parts by weight of component c), and mixtures thereof.

5. The composite according to claim 1, wherein the molding composition of layer I comprises:
a member selected from the group consisting of at least 30 parts by weight of component a), at least 10 parts by weight of component b), at least 30 parts by weight of component c), and mixtures thereof.

6. The composite according to claim 1, wherein the molding composition of layer I comprises at most 70 parts by weight of component a) or at most 80 parts by weight of component b) or at most 70 parts by weight of component c).

7. The composite according to claim 1, wherein the molding composition of layer I comprises at most 60 parts by weight of component a) or at most 60 parts by weight of component b) or at most 60 parts by weight of component c).

8. The composite according to claim 1, wherein the molding composition of layer I has not more than 40 parts by weight of component b).

9. The composite according to claim 1, wherein the polyamine-polyamide copolymer is obtained from 1 to 20% by weight of the polyamine.

10. The composite according to claim 1, wherein the polyamine contains at least 8 nitrogen atoms.

11. The composite according to claim 1, wherein the polyamine has a number-average molecular weight Mn of at least 500 g/mol.

12. The composite according to claim 1, wherein the amino group concentration in the polyamine-polyamide copolymer is in the range from 100 to 2 500 mmol/kg.

13. The composite according to claim 1, wherein the molding composition of layer I comprises a block copolymer formed from components a) and c).

14. The composite according to claim 1, wherein the composite comprises at least one layer II obtained from a molding composition based on a member selected from the group consisting of polyamide 11, polyamide 12, polyamide 612, polyamide 1012, polyamide 1212, and mixtures thereof.

15. The composite according to claim 1, wherein the composite comprises at least one layer III obtained from a molding composition based a member selected from the group consisting of on polyamide 6, polyamide 66, polyamide 6/66, and mixtures thereof.

16. The composite according to claim 15, wherein the composite has the layer sequence I/III.

17. The composite according to claims 14 or 15, wherein the composite has the layer sequence II/I/III.

18. The composite according to claims 14 or 15, wherein the composite has a symmetrical structure and either has the layer sequence II/I/II or has the layer sequence II/I/III/I/II.

19. The composite according to claim 1, wherein the composite also comprises a regrind layer.

20. The composite according to claim 1, wherein the molding composition comprises not more than 50% by weight of an additive.

21. The composite according to claim 13, wherein the layer II is the outer layer.

22. The composite according to claim 1, wherein one of the layers is electrically conductive.

23. A hollow article or hollow profile, comprising:
the composite according to claim 1, and
an internal electrically conductive layer.

24. The composite according to claim 1, wherein the composite is a tube.

25. The composite according to claim 24, wherein at least one region of the composite is corrugated.

26. The composite according to claim 1, wherein the composite is a hollow article.

27. A hollow article or hollow profile, comprising:
the composite according to claim 1, and
an elastomer layer adjacent to an outermost layer.

28. The composite according to claim 1, wherein the composite is a fuel piping, a brake-fluid piping, a coolant piping, a hydraulic-fluid piping, a fuel-pump piping, an air-conditioner piping, or a vapor line.

29. The hollow article or hollow profile according to claim 27, which is a container, or a filler pipe.

30. The composite according to claim 1, wherein the composite is a film.

31. The composite according to claim 1, wherein the composite is produced by multicomponent injection molding, coextrusion or coextrusion blow molding.

32. A composite having two or more layers and comprising:
a layer I obtained form a molding composition comprising:
a) from 0 to 80 parts by weight of a polyamide selected from the group consisting of polyamide 6, polyamide 66, polyamide 6/66 and a mixture thereof;
b) from 0.05 to 100 parts by weight of a polyamine-polyamide copolymer prepared from the following monomers:
α) from 0.5 to 25% by weight, based on the polyamine-polyamide copolymer, of a polyamine having at least 4 nitrogen atoms and having a number-average molecular weight $M_n$ of at least 146 g/mol, and
β) a polyamide-forming monomer selected from the group consisting of a lactam, a ω-aminocarboxylic acid, an equimolar combination of a diamine and a dicarboxylic acid and a mixture thereof; and
a) from 0 to 80 parts by weight of a polyamide selected from the group consisting of polyamide 6, polyamide 66, polyamide 6/66 and a mixture thereof;
b) from 0.05 to 100 parts by weight of a polyamine-polyamide copolymer prepared from the following monomers:
α) from 0.5 to 25% by weight, based on the polyamine-polyamide copolymer, of a polyamine having at least 4 nitrogen atoms and having a number-average molecular weight $M_n$ of at least 146 g/mol, and
β) a polyamide-forming monomer selected from the group consisting of a lactam, a ω-aminocarboxylic acid, an equimolar combination of a diamine and a dicarboxylic acid and a mixture thereof; and
c) from 0 to 80 parts by weight of a polyamide selected from the group consisting of polyamide 11, polyamide 12, polyamide 612, polyamide 1012, polyamide 1212 and a mixture thereof;
wherein a total of the parts by weight of components a), b) and c) is 100;
wherein a total amount of said polyamide a) and said polyamine-polyamide b) contains at least 20 parts by weight of a monomer unit which is obtained i) by ring-opening polymerization of caprolactam, or ii) by polycondensing hexamethylenediamine and adipic acid or iii) by copolycondensing caprolactam, hexamethylenediamine and adipic acid; and wherein a total of said polyamine-polyamide b) and said polyamide c) contains at least 20 parts by weight of a monomer unit which is obtained by polycondensing of ω-aminoundecanoic acid, or ring-opening and polycondensing of laurolactam or polycondensing c) from 0 to 80 parts by weight of a polyamide selected from the group consisting of polyamide 11, polyamide 12, polyamide 612, polyamide 1012, polyamide 1212 and a mixture thereof;

wherein a total of the parts by weight of components a), b) and c) is 100;

wherein a total amount of said polyamide a) and said polyamine-polyamide b) contains at least 20 parts by weight of a monomer unit which is obtained i) by ring-opening polymerization of caprolactam, or ii) by polycondensing hexamethylenediamine and adipic acid or iii) by copolycondensing caprolactam, hexamethylenediamine and adipic acid; and wherein a total of said polyamine-polyamide b) and said polyamide c) contains at least 20 parts by weight of a monomer unit which is obtained by polycondensing of ω-aminoundecanoic acid, or ring-opening and polycondensing of laurolactam or polycondensing of at least one of the following mixtures: a mixture of hexamethylenediamine and 1, 12 dodecanedioic acid, a mixture of 1, 10 decanediamine and 1, 12 dodecanedioic acid, a mixture of 1, 12 dodecanediamine and 1, 12 dodecanedioic acid;

wherein the molding composition of layer I is obtained by subjecting a blend comprising polyamide a) and said polyamide c) to solid-phase post-condensation;

wherein at least one of a) or c) is present.

33. The composite according to claim 32, wherein a temperature of said solid-phase post-condensation is from 140° C. to about 5 K below a crystalline melting point $T_m$ of the polyamides.

34. A composite having two or more layers and comprising:

a layer I obtained form a molding composition comprising:

a) from 0 to 80 parts by weight of a polyamide selected from the group consisting of polyamide 6, polyamide 66, polyamide 6/66 and a mixture thereof;

b) from 0.05 to 100 parts by weight of a polyamine-polyamide copolymer prepared from the following monomers:

α) from 0.5 to 25% by weight, based on the polyamine-polyamide copolymer, of a polyamine having at least 4 nitrogen atoms and having a number-average molecular weight $M_n$ of at least 146 g/mol, and β) a polyamide-forming monomer selected from the group consisting of a lactam, a ω-aminocarboxylic acid, an equimolar combination of a diamine and a dicarboxylic acid and a mixture thereof; and c) from 0 to 80 parts by weight of a polyamide selected from the group consisting of polyamide 11, polyamide 12, polyamide 612, polyamide 1012, polyamide 1212 and a mixture thereof;

wherein a total of the parts by weight of components a), b) and c) is 100;

wherein a total amount of said polyamide a) and said polyamine-polyamide b) contains at least 20 parts by weight of a monomer unit which is obtained i) by ring-opening polymerization of caprolactam, or ii) by polycondensing hexamethylenediamine and adipic acid or iii) by copolycondensing caprolactam, hexamethylenediamine and adipic acid; and wherein a total of said polyamine-polyamide b) and said polyamide c) contains at least 20 parts by weight of a monomer unit which is obtained by polycondensing of ω-aminoundecanoic acid, or ring-opening and polycondensing of laurolactam or polycondensing of at least one of the following mixtures: a mixture of hexamethylenediamine and 1, 12 dodecanedioic acid, a mixture of 1, 10 decanediamine and 1, 12 dodecanedioic acid, a mixture of 1, 12 dodecanediamine and 1, 12 dodecanedioic acid;

wherein either polyamide a) or c) contains an excess of amino end groups and the other polyamide contains an excess of carboxyl end groups;

wherein at least one of a) or c) is present.

35. A composite having two or more layers and comprising:

a layer I obtained form a molding composition comprising:

a) from 0 to 80 parts by weight of a polyamide selected from the group consisting of polyamide 6, polyamide 66, polyamide 6/66 and a mixture thereof;

b) from 0.05 to 100 parts by weight of a polyamine-polyamide copolymer prepared from the following monomers:

α) from 0.5 to 25% by weight, based on the polyamine-polyamide copolymer, of a polyamine having at least 4 nitrogen atoms and having a number-average molecular weight $M_n$ of at least 146 g/mol, and β) a polyamide-forming monomer selected from the group consisting of a lactam, a ω-aminocarboxylic acid, an equimolar combination of a diamine and a dicarboxylic acid and a mixture thereof; and c) from 0 to 80 parts by weight of a polyamide selected from the group consisting of polyamide 11, polyamide 12, polyamide 612, polyamide 1012, polyamide 1212 and a mixture thereof;

wherein a total of the parts by weight of components a), b) and c) is 100;

wherein a total amount of said polyamide a) and said polyamine-polyamide b) contains at least 20 parts by weight of a monomer unit which is obtained i) by ring-opening polymerization of caprolactam, or ii) by polycondensing hexamethylenediamine and adipic acid or iii) by copolycondensing caprolactam, hexamethylenediamine and adipic acid; and wherein a total of said polyamine-polyamide b) and said polyamide c) contains at least 20 parts by weight of a monomer unit which is obtained by polycondensing of ω-aminoundecanoic acid, or ring-opening and polycondensing of laurolactam or polycondensing of at least one of the following mixtures: a mixture of hexamethylenediamine and 1, 12 dodecanedioic acid, a mixture of 1, 10 decanediamine and 1, 12 dodecanedioic acid, a mixture of 1, 12 dodecanediamine and 1, 12 dodecanedioic acid;

wherein components a) and c) are linked by adding a reactive compound which links the polyamide end groups to one another;

wherein a) and c) are present.

36. The composite according to claim 35, wherein said reactive compound is selected from the group consisting of a bisoxazoline, a biscarbodiimide, a bismaleimide, a bisanhydride, a diisocyanate and a mixture thereof.

37. The composite according to claim 26, which is a container, or a filler pipe.

* * * * *

UNITED STATES PATENT AND TRADEMARK OFFICE
CERTIFICATE OF CORRECTION

PATENT NO. : 6,783,821 B2
DATED : August 31, 2004
INVENTOR(S) : Ries et al.

It is certified that error appears in the above-identified patent and that said Letters Patent is hereby corrected as shown below:

Title page,
Items [45] and [*] Notice, should read as follows:
-- [45] **Date of Patent: *Aug. 31, 2004**
  [*]    Notice: Subject to any disclaimer, the term of this patent is extended or adjusted under 35 U.S.C. 154(b) by 70 days.
This Patent is subject to a terminal disclaimer. --

Signed and Sealed this

Seventh Day of December, 2004

JON W. DUDAS
*Director of the United States Patent and Trademark Office*